United States Patent
Wu

(10) Patent No.: US 12,262,379 B2
(45) Date of Patent: Mar. 25, 2025

(54) METHOD AND APPARATUS FOR DETERMINING HYBRID AUTOMATIC REPEAT REQUEST ACKNOWLEDGMENT CODEBOOK, AND DEVICE THEREOF

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 336 days.

(21) Appl. No.: 17/836,232

(22) Filed: Jun. 9, 2022

(65) Prior Publication Data
US 2022/0304029 A1    Sep. 22, 2022

Related U.S. Application Data

(63) Continuation of application No. PCT/CN2020/087679, filed on Apr. 29, 2020.

(30) Foreign Application Priority Data

Feb. 14, 2020    (CN) .......................... 202010093734.4

(51) Int. Cl.
*H04W 72/23*    (2023.01)
*H04L 1/1812*   (2023.01)
(Continued)

(52) U.S. Cl.
CPC ....... *H04W 72/1273* (2013.01); *H04L 1/1812* (2013.01); *H04L 1/1854* (2013.01); *H04L 5/0053* (2013.01); *H04W 72/23* (2023.01)

(58) Field of Classification Search
CPC . H04W 72/12; H04W 72/23; H04W 72/1273; H04W 72/1278; H04W 74/0541;
(Continued)

(56) References Cited

U.S. PATENT DOCUMENTS 12,184,430 B2 * 12/2024 Lei .................. H04L 1/1822
2012/0176957 A1   7/2012 Chen et al.
(Continued)

FOREIGN PATENT DOCUMENTS

CN    103139717 A    6/2013
CN    104170306 A    11/2014
(Continued)

OTHER PUBLICATIONS

First Office Action issued in corresponding European application No. 20919075.0, mailed Aug. 29, 2023.
(Continued)

*Primary Examiner* — Jean A Gelin
(74) *Attorney, Agent, or Firm* — BAYES PLLC

(57) ABSTRACT

The present disclosure is related to a HARQ-ACK codebook determination method. The method includes receiving trigger information sent by a network device, wherein the trigger information is used to indicate the user equipment to perform One-Shot HARQ-ACK feedback; and according to data scheduling information corresponding to a target Transport Block (TB) in a target HARQ process, determining HARQ-ACK information for the target TB in the target HARQ process in a Type-3 HARQ-ACK codebook. The Type-3 HARQ-ACK codebook includes HARQ-ACK information corresponding to all HARQ processes on all configured carriers in a PUCCH group.

18 Claims, 3 Drawing Sheets

(51) Int. Cl.
    *H04L 1/1829*    (2023.01)
    *H04L 5/00*      (2006.01)
    *H04W 72/1273*   (2023.01)
(58) Field of Classification Search
    CPC ... H04L 1/1812; H04L 1/1822; H04L 1/1854;
            H04L 1/1861; H04L 1/1887; H04L
            5/0053
    USPC ......................................................... 370/329
    See application file for complete search history.

(56) References Cited

U.S. PATENT DOCUMENTS

| | | | |
|---|---|---|---|
| 2015/0230269 | A1 | 8/2015 | Park et al. |
| 2021/0168776 | A1* | 6/2021 | Li ..................... H04W 74/0808 |
| 2021/0328728 | A1* | 10/2021 | El Hamss ............. H04L 1/1854 |
| 2022/0007399 | A1* | 1/2022 | Rastegardoost ...... H04L 1/1854 |
| 2022/0110150 | A1* | 4/2022 | Lin ....................... H04L 1/1812 |
| 2022/0303064 | A1* | 9/2022 | Yang .................... H04L 1/1896 |
| 2022/0303100 | A1* | 9/2022 | Yang .................... H04L 1/1671 |
| 2022/0353853 | A1* | 11/2022 | Wu ....................... H04W 72/23 |
| 2024/0023135 | A1* | 1/2024 | Ye ........................ H04L 1/1822 |
| 2024/0154733 | A1* | 5/2024 | Lei ....................... H04L 1/1685 |

FOREIGN PATENT DOCUMENTS

| | | |
|---|---|---|
| CN | 105790897 A | 7/2016 |
| CN | 104396174 B | 9/2018 |
| CN | 108633097 A | 10/2018 |
| CN | 108809534 A | 11/2018 |
| CN | 109586866 A | 4/2019 |
| CN | 109639398 A | 4/2019 |
| CN | 110086583 A | 8/2019 |
| CN | 110140315 A | 8/2019 |
| CN | 110351025 A | 10/2019 |
| CN | 110635868 A | 12/2019 |
| CN | 112839379 A | 5/2021 |
| WO | 2019062837 A1 | 4/2019 |
| WO | 2019099670 A1 | 5/2019 |

OTHER PUBLICATIONS

Notice of Allowance issued in corresponding Chinese application No. 202210514406.6, mailed Oct. 18, 2023.
Title: Research and Design of HARQ Mechanism for LTE System; Author: Zhang Demin, Yao Sheng; Release Date: Dec. 15, 2012; Publisher: Guangdong Communication Technology.
Tao Peng et al., "A Data-Driven and Load-Aware Interference Management Approach for Ultra-Dense Networks", IEEE Access, vol. 7, 2019, date of publication Sep. 5, 2019.
First Office Action issued in corresponding Indian application No. 202227033360, mailed Sep. 20, 2022.
Extended European Search Report issued in corresponding European application No. 20919075.0, mailed Dec. 13, 2022.
Xiaomi, "Discussion on HARQ enhancement for NR-U", R1-1911992, 3GPP TSG RAN WG1 #99 Reno, USA, Nov. 18-22, 2019.
ITRI, "Remaining issues of HARQ enhancements for NR-U", R1-1912858, 3GPP TSG RAN WG1 #99 Reno, USA, Nov. 18-22, 2019.
Nokia et al., "Remaining details on NR-U HARQ scheduling and feedback", R1-1912261, 3GPP TSG RAN WG1 #99 Reno, USA, Nov. 18-22, 2019.
Priority Review issued in corresponding Chinese application No. 202210514406.6, mailed Jun. 7, 2023.
First Office Action issued in corresponding Chinese application No. 202210514406.6, mailed Jun. 22, 2023.
International Search Report dated Nov. 5, 2020 from the International Searching Authority Re. Application No. PCT/CN2020/087679, 4 pages.
International Written Opinion dated Nov. 5, 2020 from the International Searching Authority Re. Application No. PCT/CN2020/087679, 12 pages.
"Introduction of shared spectrum channel access", Source: Samsung, 3GPP TSG-RAN WG1 Meeting #99, R1-1913632, Reno, USA, Nov. 18-22, 2019, 45 pages.
"Remaining issues on HARQ enhancements for NR-U", Source: OPPO, 3GPP TSG RAN WG1 #100-E, R1-2000472, Athens, Greece, Feb. 24-28, 2020, 12 pages.
"Text proposals for HARQ enhancement for NR-U", Source: Lenovo et al., 3GPP TSG RAN WG1 #100, R1-2000592, E-meeting, Feb. 24-Mar. 6, 2020, 9 pages.
3GPP TS 38.213 V16.0.0 (Dec. 2019); Technical Specification Group Radio Access Network; NR; Physical layer procedures for control (Release 16), Dec. 2019, 146 pages.
"On CBG based transmissions", Source: Nokia et al., 3GPP TSG RAN WG1 Meeting 90bis, R1-1718622, Prague, CZ, Oct. 9-13, 2017, 8 pages.
"DL control signaling design for CBG-based operation", Source: CATT, 3GPP TSG RAN WG1 Meeting #90, R1-1712416, Prague, Czechia, Aug. 21-25, 2017, 4 pages.
"Remaining issues for CBG", Source: ZTE et al., 3GPP TSG RAN WG1 Meeting AH 1801, R1-1800139, Vancouver, Canada, Jan. 22-26, 2018, 7 pages.
"Feature lead summary#1 of HARQ enhancements for NR-U", Source: Huawei, 3GPP TSG RAN WG1 Meeting #99, R1-1913288, Reno, USA, Nov. 18-22, 2019, 39 pages.
"Feature lead summary#2 of HARQ enhancements for NR-U", Source: Huawei, 3GPP TSG RAN WG1 Meeting #99, R1-1913418, Reno, USA, Nov. 18-22, 2019, 43 pages.
"Clarification on Type-2 HARQ-ACK codebook determination in TS 38.213", Source: Fujitsu, 3GPP TSG RAN WG1 Meeting AH 1801, R1-1800128, Vancouver, Canada, Jan. 22-26, 2018, 10 pages.
First Office Action issued in corresponding Japanese application No. 2022-547790, mailed Dec. 15, 2023.
Summons to attend oral proceedings issued in corresponding European application No. 20919075.0, mailed Jan. 30, 2024.
Decision to Refuse a European Patent Application issued in corresponding European Application No. 20919075.0, dated Jul. 16, 2024, 22 pages.
Extended European Search Report issued in corresponding European Application No. 24200264.0, mailed Nov. 25, 2024, 12 pages.

* cited by examiner

METHOD AND APPARATUS FOR DETERMINING HYBRID AUTOMATIC REPEAT REQUEST ACKNOWLEDGMENT CODEBOOK, AND DEVICE THEREOF

CROSS REFERENCE OF RELATED APPLICATIONS

This application is a continuation application of an International Application No. PCT/CN2020/087679, filed on Apr. 29, 2020, which claims the priority of the Chinese Application No. 202010093734.4, filed on Feb. 14, 2020, the contents of which are incorporated herein by reference in their entireties.

TECHNICAL FIELD

Embodiments of the present disclosure generally relate to the communication technical field, and more particularly, to the technical field regarding codebook feedback.

BACKGROUND

Unlicensed spectrum is the spectrum allocated by countries and regions that can be used for radio device communication. This spectrum is generally considered to as a shared spectrum, that is, communication devices in different communication systems can use this spectrum as long as the communication devices meet regulatory requirements set by the countries or regions on the spectrum, and there is no need to apply for an exclusive spectrum license from a government.

A new Hybrid Automatic Repeat-reQuest (HARQ) feedback method is introduced in the New Radio (NR) unlicensed spectrum system, which is referred to as One-Shot HARQ feedback. A network device may trigger User Equipment (UE) to perform One-Shot HARQ feedback through Downlink Control Information (DCI) information, that is, trigger the UE to feed a Type-3 codebook back to the network device. The Type-3 codebook may include two types: Type 1 is One-Shot HARQ feedback that carries New Data Indicator (NDI); Type 2 is One-Shot HARQ feedback that does not carry NDI. The network device may perform configurations for the UE through Radio Resource Control (RRC) signaling, and thus the UE carries NDI information or does not carry NDI information when performing HARQ feedback.

However, in related art, when the user equipment feeds back the One-Shot HARQ feedback that does not carry the NDI information, the reset procedure of the Type-3 HARQ-ACK codebook will cause that the user equipment cannot transmit the HARQ-ACK information correctly.

SUMMARY

Embodiments of the present disclosure provide a method, an apparatus, and a device for ensuring that user equipment can correctly feed back HARQ-ACK information.

Embodiments of the present disclosure provide the following technical solutions:

There is provided a Hybrid Automatic Repeat-reQuest-Acknowledge (HARQ-ACK) codebook determination method. The method is applied to user equipment. The method includes:
  receiving trigger information sent by a network device, wherein the trigger information is used to indicate the user equipment to perform One-Shot HARQ-ACK feedback; and
  according to data scheduling information corresponding to a target Transport Block (TB) in a target HARQ process, determining HARQ-ACK information for the target TB in the target HARQ process in a Type-3 HARQ-ACK codebook, wherein the Type-3 HARQ-ACK codebook includes HARQ-ACK information corresponding to all HARQ processes on all configured carriers in a Physical Uplink Control Channel (PUCCH) group.

There is provided a Hybrid Automatic Repeat-reQuest-Acknowledge (HARQ-ACK) codebook determination method. The method is applied to a network device. The method includes:
  sending trigger information to user equipment, wherein the trigger information is used to indicate the user equipment to perform One-Shot HARQ-ACK feedback; and
  receiving a Type-3 HARQ-ACK codebook which is fed back by the user equipment, wherein the Type-3 HARQ-ACK codebook includes HARQ-ACK information corresponding to all HARQ processes on all configured carriers in a Physical Uplink Control Channel (PUCCH) group, and HARQ-ACK information for a target Transport Block (TB) in a target HARQ process in the Type-3 HARQ-ACK codebook is determined by the user equipment according to data scheduling information corresponding to the target TB in the target HARQ process.

There is provided a Hybrid Automatic Repeat-reQuest-Acknowledge (HARQ-ACK) codebook determination device. The device is applied to user equipment. The device includes:
  an information receiving module configured to receive trigger information sent by a network device, wherein the trigger information is used to indicate the user equipment to perform One-Shot HARQ-ACK feedback; and
  a determination module configured to, according to data scheduling information corresponding to a target Transport Block (TB) in a target HARQ process, determine HARQ-ACK information for the target TB in the target HARQ process in a Type-3 HARQ-ACK codebook, wherein the Type-3 HARQ-ACK codebook includes HARQ-ACK information corresponding to all HARQ processes on all configured carriers in a Physical Uplink Control Channel (PUCCH) group.

There is provided a Hybrid Automatic Repeat-reQuest-Acknowledge (HARQ-ACK) codebook determination device. The device is applied to a network device. The device includes:
  a trigger module configured to send trigger information to user equipment, wherein the trigger information is used to indicate the user equipment to perform One-Shot HARQ-ACK feedback; and
  a codebook receiving module configured to receive a Type-3 HARQ-ACK codebook which is fed back by the user equipment, wherein the Type-3 HARQ-ACK codebook includes HARQ-ACK information corresponding to all HARQ processes on all configured carriers in a Physical Uplink Control Channel (PUCCH) group, and HARQ-ACK information for a target Transport Block (TB) in a target HARQ process in the Type-3 HARQ-ACK codebook is determined by the user equipment according to data scheduling information corresponding to the target TB in the target HARQ process.

There is provided user equipment, including a processor, a memory and a network interface, wherein the processor is configured to call a program in the memory to execute any one of the Hybrid Automatic Repeat-reQuest-Acknowledge (HARQ-ACK) codebook determination methods applied to the user equipment in embodiments of the present disclosure, and send an execution result through the network interface.

There is provided a network device, including a processor, a memory and a network interface, wherein the processor is configured to call a program in the memory to execute any one of the Hybrid Automatic Repeat-reQuest-Acknowledge (HARQ-ACK) codebook determination methods applied to a network device in embodiments of the present disclosure, and send an execution result through the network interface.

There is provided a chip including a processor configured to call and run a computer program in a memory to cause a device in which the chip is installed to perform any one of the Hybrid Automatic Repeat-reQuest-Acknowledge (HARQ-ACK) codebook determination methods in embodiments of the present disclosure.

There is provided a computer-readable storage medium having programs for a Hybrid Automatic Repeat-reQuest-Acknowledge (HARQ-ACK) codebook determination method stored thereon, wherein when the programs for the HARQ-ACK codebook determination method are executed by a processor, the processor is caused to perform any one of the HARQ-ACK codebook determination methods in embodiments of the present disclosure.

There is provided a computer program product, wherein the computer program product is stored in a non-transitory computer-readable storage medium, and when the computer program is executed, any one of the Hybrid Automatic Repeat-reQuest-Acknowledge (HARQ-ACK) codebook determination methods in embodiments of the present disclosure is performed.

The beneficial effects of the present disclosure are as follows: when the HARQ-ACK information bit for each TB is fed back, the HARQ-ACK information included in the Type-3 HARQ-ACK codebook to be fed back is determined according to the data scheduling information corresponding to the target TB in the target HARQ process, rather than directly setting the HARQ-ACK information as NACK after the user equipment has reported ACK. In this way, embodiments of the present disclosure can ensure that the Type-3 HARQ-ACK codebook is correctly reset or generated.

DETAILED DESCRIPTION

In order to make the objectives, technical solutions and advantages of the present disclosure more clearly understood, the present disclosure will be described in further detail below with reference to the accompanying drawings and embodiments. It should be understood that the embodiments described herein are only used to explain the present disclosure, but not intended to limit the present disclosure. The present disclosure may be implemented in many different forms and is not limited to the embodiments described herein. Rather, these embodiments are provided to provide a thorough and complete understanding of the present disclosure. Based on the specific embodiments in the present disclosure, all other specific embodiments obtained by those skilled in the art without creative work fall within the protection scope of the present disclosure.

Where the following description refers to the drawings, the same numerals in different drawings refer to the same or similar elements unless otherwise indicated.

Additionally, the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the associated objects are an "or" relationship.

It should be understood that, in the specific implementations of the present disclosure, "B corresponding to A" means that B is associated with A, and B can be determined according to A. However, it should also be understood that determining B based on A does not mean determining B based only on A, but B may be determined based on A and/or other information.

Figure 1:
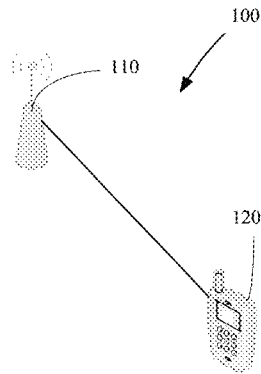
FIG. 1 is a system architecture diagram to which an embodiment of the present disclosure is applied.

FIG. 1 shows a wireless communication system 100 to which the embodiments of the present disclosure are applied. The wireless communication system 100 includes: a network device 110 and at least one user equipment 120 located within the coverage of the network device 110. Communication is performed between the network device 110 and the user equipment 120.

According to some other embodiments, the wireless communication system 100 may include multiple network devices, and the coverage of each network device may include other user equipment, and embodiments of the present disclosure do not impose specific limitations on this. According to some embodiments, the network device 110 may provide communication coverage for a specific geographic area, and may communicate with user equipment (e.g., UE) within the coverage area. According to some embodiments, the network device 100 may be a base station (Base Transceiver Station, BTS) in a GSM system or a CDMA system, or may be a base station (NodeB, NB) in a WCDMA system, or an evolved base station (Evolutional Node B, eNB or eNodeB) in an LTE system, or a wireless controller in a Cloud Radio Access Network (CRAN), or the network device can be a relay station, an access point, an in-vehicle device, a wearable device, a network side device in the 5G network or a network device in a future evolved Public Land Mobile Network (PLMN).

The embodiments of the present disclosure may be applied to various communication systems, for example: a Global System of Mobile communication (GSM) system, a Code Division Multiple Access (CDMA) system, a Wideband Code Division Multiple Access (WCDMA) system, General Packet Radio Service (GPRS) system, Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication system or other communication systems, etc.

The user equipment 120 may be mobile or stationary. According to some embodiments, the user equipment 120 may refer to an access terminal, User Equipment (UE), subscriber unit, subscriber station, mobile station, mobile terminal, remote station, remote terminal, mobile device, user device, terminal, wireless communication device, user agent or user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing devices or other processing devices connected to a wireless modem, an in-vehicle device, a wearable device, user equipment in 5G networks or user equipment in future evolved PLMNs, etc.

Generally speaking, traditional communication systems support a limited number of connections and are easy to implement. However, with the development of communication technologies, mobile communication systems will not only support traditional communications, but also support, for example, Device to Device (D2D) communication, Machine to Machine (M2M) communication, Machine Type Communication (MTC), and Vehicle to Vehicle (V2V) communication, etc. The embodiments of the present disclosure can also be applied to these communications systems.

According to some embodiments, the communication system in embodiments of the present disclosure may be applied to a Carrier Aggregation (CA) scenario, or may be applied to a Dual Connectivity (DC) scenario, or may be applied to a Standalone (SA) network deployment scenario.

Embodiments of the present disclosure do not limit the applied spectrum. For example, the embodiments of the present disclosure may be applied to licensed spectrum, and may also be applied to unlicensed spectrum.

First Embodiment

Figure 2:
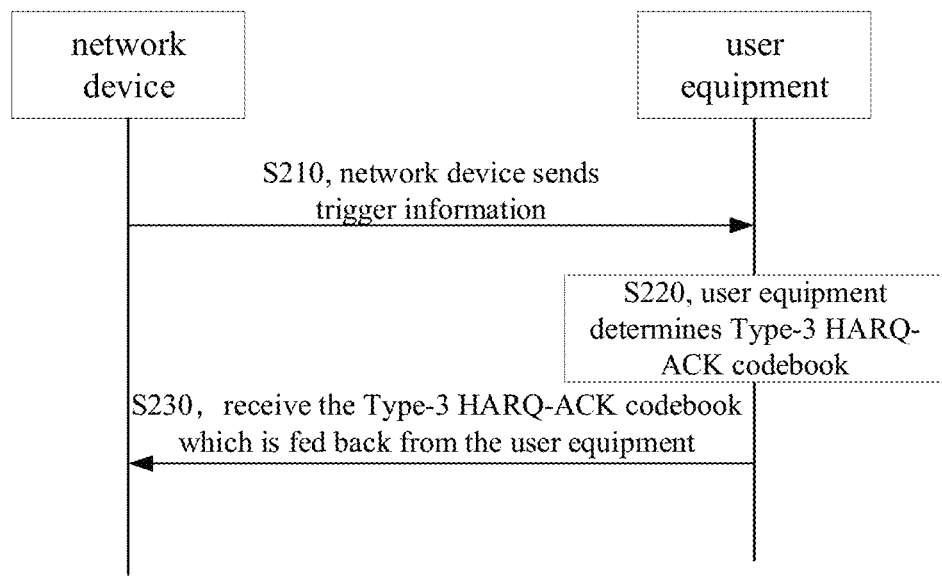
FIG. 2 is an interaction diagram of a HARQ-ACK codebook determination method according to a first embodiment of the present disclosure.

FIG. 2 is a HARQ-ACK codebook determination method provided by the first embodiment of the present disclosure. The method includes:

In step S210, a network device sends trigger information to user equipment. The trigger information is used to indicate the user equipment to perform One-Shot HARQ-ACK feedback. According to some embodiments, the trigger information includes Downlink Control Information (DCI) sent by the network device to the user equipment.

In step S220, the user determines the Type-3 HARQ-ACK codebook. Specifically, the user equipment determines HARQ-ACK information for a target TB in a target HARQ process in the Type-3 HARQ-ACK codebook according to data scheduling information corresponding to the target TB in the target HARQ process. The Type-3 HARQ-ACK codebook includes HARQ-ACK information corresponding to all HARQ processes on all configured carriers in a Physical Uplink Control Channel (PUCCH) group.

In step S230, the network device receives the Type-3 HARQ-ACK codebook fed back by the user equipment. The Type3 codebook includes two types: Type 1 is One-Shot HARQ feedback that carries New Data Indicator (NDI); Type 2 is One-Shot HARQ feedback that does not carry NDI. The network device may perform configurations for User Equipment (UE) through Radio Resource Control (RRC) signaling, so that the UE carries NDI information or does not carry NDI information when performing HARQ feedback.

Type 1: One-Shot HARQ Feedback carrying NDI
  1) The user equipment feeds back the NDI information and HARQ-ACK information corresponding to the last received HARQ process number.
  2) If a certain HARQ process has no prior NDI information, the user equipment assumes that the NDI value is 0.
  3) Each TB corresponds to an NDI value.

Type 2: One-Shot HARQ feedback without NDI
  1) The user equipment feeds back the HARQ-ACK information corresponding to the HARQ process number and does not feed back the corresponding NDI information.
  2) For a certain HARQ process, if the user equipment has fed ACK back for once, the state of the HARQ process should be reset.

The data scheduling information may be used to indicate that the target TB is currently scheduled for new transmission, retransmission, or unscheduled.

The HARK-ACK information includes ACK information or NACK information.

According to some embodiments, the data scheduling information corresponding to the target TB includes one of first information, second information and third information.

The first information includes: information that the target TB is currently scheduled for new transmission;
  the second information includes: information that the target TB is currently scheduled for retransmission;
  the third information includes: information that the target TB is not currently scheduled.

According to some embodiments, the information that the target TB is currently scheduled for new transmission includes that: current NDI information for the target TB has a value different from last NDI information, or the target TB is a TB in Semi-Persistent Scheduling (SPS) PDSCH.

According to some embodiments, the information that the target TB is currently scheduled for retransmission includes that: the current NDI information for the target TB has a value the same as the last NDI information, or the target TB is the TB in the SPS PDSCH and the value of the NDI information is 1.

According to some embodiments, the information that the target TB is not currently scheduled includes that: the target TB does not currently correspond to NDI information, or the target TB does not currently correspond to NDI information and is not the TB in the SPS PDSCH.

According to some embodiments, the target TB not currently corresponding to DCI information includes that: the target TB is not currently indicated by DCI with NDI information.

Specifically, for data transmission scheduled by PDCCH, the DCI includes an NDI field, or in other words, each TB corresponds to one piece of NDI information. For a TB number in a scheduled HARQ process, if the NDI information corresponding to the TB number received by the terminal device is toggled with respect to the last NDI information corresponding to the TB number received by the terminal device, it means that the TB currently received by the terminal device is a new transmission; if the NDI information corresponding to the TB number received by the terminal device is not toggled with respect to the last NDI information corresponding to the TB number received by the terminal device, it means that the TB currently received by the terminal device is a retransmission.

For data transmission without PDCCH scheduling, such as transmission on Semi-Persistent Scheduling (SPS) configuration resources, the SPS PDSCH transmitted on downlink SPS configuration resources only includes initial transmission. If the initial transmission of a HARQ process fails and retransmission is needed, the network device schedules the same HARQ process through DCI scrambled by Configured Scheduling Radio Network Temporary Identifier (CS-RNTI), and sets the NDI field to "1". That is, if the terminal device receives the DCI scrambled by CS-RNTI and the NDI field is set to "1", the terminal device considers the HARQ process scheduled by the DCI to be retransmission. In other words, the TB with the NDI field set to "1" in the HARQ process is a TB in the SPS PDSCH.

According to some embodiments, the information that the target TB is currently scheduled for new transmission includes that: the terminal device receives DCI, the DCI includes scheduling information for the target TB in the target HARQ process, and the NDI information corresponding to the target TB is toggled with respect to the last NDI information corresponding to the target TB in the target HARQ process; or, the terminal device receives the SPS PDSCH corresponding to the target TB in the target HARQ process.

According to some embodiments, the information that the target TB is currently scheduled for retransmission includes that: the terminal device receives DCI, the DCI includes scheduling information for the target TB in the target HARQ process, and the NDI information corresponding to the target TB is not toggled with respect to the last NDI information corresponding to the target TB in the target HARQ process; or, the terminal device receives a DCI scrambled by CS-RNTI, and the DCI includes the scheduling information for the target TB in the target HARQ process, and the NDI information corresponding to the target TB is set to "1".

According to some embodiments, the information that the target TB is not currently scheduled includes that: the terminal device has not received DCI including the scheduling information for the target TB in the target HARQ process; or, the terminal device does not receive SPS PDSCH corresponding to the target TB in the target HARQ process.

According to some embodiments, the information that the target TB is currently scheduled includes: the information that the target TB is currently scheduled for new transmission, or the information that the target TB is currently scheduled for retransmission.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user equipment has reported ACK and the data scheduling information corresponding to the target TB is the second information or the third information, determining, by the user equipment, that the HARQ-ACK information for the target TB is NACK.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user terminal has reported ACK and the data scheduling information corresponding to the target TB is the first information, determining, by the user equipment, that the HARQ-ACK information for the target TB is a decoding result.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user equipment has reported NACK and the data scheduling information corresponding to the target TB is the first information or the second information, determining, by the user equipment, that the HARQ-ACK information for the target TB is a decoding result.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user terminal has reported NACK and the data scheduling information corresponding to the target TB is the third information, determining, by the user equipment, that the HARQ-ACK information for the target TB is NACK.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user terminal has reported ACK or NACK and the data scheduling information corresponding to the target TB includes the third information, determining, by the user equipment, that the HARQ-ACK information for the target TB is NACK.

According to some embodiments, determining the HARQ-ACK information for the target TB in the target HARQ process in the Type-3 HARQ-ACK codebook according to the data scheduling information corresponding to the target TB in the target HARQ process in S220 includes:
  for the target TB in the target HARQ process, if the user terminal has reported ACK or NACK and the data scheduling information corresponding to the target TB includes the first information, determining, by the user equipment, that the HARQ-ACK information for the target TB is a decoding result of the target TB.

According to some embodiments, determining the HARQ-ACK information for the target TB in the target HARQ process in the Type-3 HARQ-ACK codebook according to the data scheduling information corresponding to the target TB in the target HARQ process in S220 includes:

for the target TB in the target HARQ process, if the user terminal has reported NACK and the data scheduling information corresponding to the target TB includes information that the target TB is currently scheduled, determining, by the user equipment, that the HARQ-ACK information for the target TB is a decoding result of the target TB. The information that the target TB is currently scheduled includes first information and/or second information.

According to some embodiments, in the One-Shot HARQ feedback, the user equipment may also be configured through RRC signaling, so that when the user equipment performs HARQ feedback, the user equipment determines whether to perform Code Block Group (CBG)-based feedback for a carrier configured with a CBG-based transmission.

According to some embodiments, when the user equipment performs CBG-based feedback on the carrier, TB-based feedback is not performed.

According to some embodiments, the ordering of the HARQ codebook follows the following principle: CBG first, or then TB, then HARQ process, and finally carrier. For example, for each carrier in the carriers arranged in ascending order, in each HARQ process among HARQ processes arranged in ascending order, the HARQ-ACK information bit corresponding to each TB of each HARQ process is fed back.

According to some embodiments, if the user equipment is configured to feed back One-Shot HARQ-ACK information based on CBG, and a target cell corresponding to the target HARQ process is configured with a CBG feedback length, the bit length of the HARQ-ACK information for the target TB is determined according to the CBG feedback length; otherwise, the bit length of the HARQ-ACK information for the target TB is determined according to the TB feedback length.

According to some embodiments, the CBG feedback length is determined according to the maxCodeBlockGroupsPerTransportBlock parameter.

According to some embodiments, the TB feedback length is determined according to the maxNrofCodeWordsScheduledByDCI parameter.

According to some embodiments, determining the HARQ-ACK information for the target TB in the target HARQ process in the Type-3 HARQ-ACK codebook includes:
   determining a bit length of the HARQ-ACK information for the target TB according to the CBG feedback length; or, determining the bit length of the HARQ-ACK information for the target TB according to the TB feedback length.

As a specific example, the first embodiment of the present disclosure may be expressed in the following manner

```
If a UE is provided pdsch-HARQ-ACK-OneShotFeedback-r16, the UE determines a Type-3
HARQ-ACK codebook according to the following procedure.
Set N_cells^DL to the number of serving cells
Set N_{HARQ, c}^{DL} to the value of nrofHARQ-ProcessesForPDSCH for serving cell c, if provided;
else, set N_{HARQ, c}^{DL} = 8
Set N_{TB, c}^{DL} to the value of maxNrofCodeWordsScheduledByDCI for serving cell c if harq-
ACK-
SpatialBundlingPUCCH is not provided; else, set N_{TB, c}^{DL} = 1
Set N_{HARQ-ACK, c}^{CBG/TB, max} to the number of HARQ-ACK information bits per TB for PDSCH
receptions on serving cell c if maxCodeBlockGroupsPerTransportBlock is provided for
serving cell c and pdsch-HARQ-ACK-OneShotFeedbackCBG-r16 is provided; else, set
N_{HARQ-ACK, c}^{CBG/TB, max} = 0
Set NDI_{HARQ} = 0 if pdsch-HARQ-ACK-OneShotFeedbackNDI-r16 is provided; else set
NDI_{HARQ} = 1
Set c = 0 - serving cell index
Set h = 0 - HARQ process number
Set t = 0 - TB index
Set g = 0 - CBG index
Set j = 0
   while c < N_cell^DL
      while h < N_{HARQ, c}^{DL}
         if NDI_{HARQ} = 0
            <the feedback including NDI is the same as existing technology, and thus details are
               omitted>
         else
            if N_{HARQ-ACK, c}^{CBG/TB, max} > 0
               while t < N_{TB, c}^{DL}
                  if UE has reported ACK for TB t for HARQ process number h on serving
                     cell c, and the NDI value is not toggled or no NDI value for TB t
                     while g < N_{HARQ-ACK, c}^{CBG/TB, max}
                        o_j^{ACK} = NACK
                        j = j + 1
                        g = g + 1
                     end while
                  else
                     while g < N_{HARQ-ACK, c}^{CBG/TB, max}
                        o_j^{ACK} = HARQ-ACK information bit for CBG g of TB t for HARQ
                           process number h of serving cell c
                        j = j + 1
                        g = g + 1
                     end while
                  end if
                  g = 0
                  t = t + 1
               end while
```

-continued

```
    else
        while t < N_{TB,c}^{DL}
            if UE has reported NACK for TB t for HARQ process number h on serving
                cell c and there is a NDI value for TB t
                õ_j^{ACK} = HARQ-ACK information bit for TB t for HARQ process h of
                    serving cell c
                j = j + 1
                t = t + 1
            else
                õ_j^{ACK} = NACK
                j = j + 1
                t = t + 1
            end if
        end while
    end if
    t = 0
    end if
    h = h + 1
    end while
    h = 0
    c = c + 1
end while
```

Figure 3:
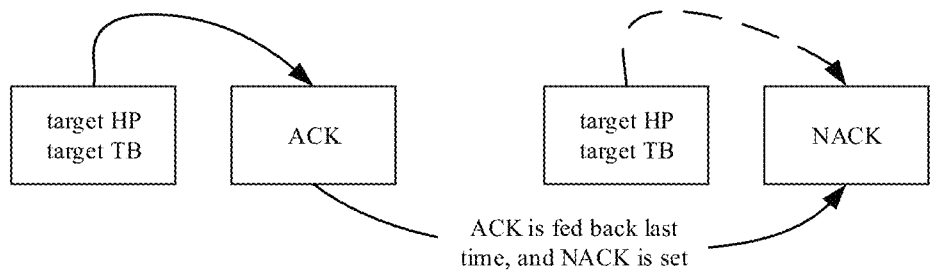
FIG. 3 is a schematic diagram showing changes in a HARQ-ACK codebook in related art.

Referring to FIG. 3, in related art, for the Type-3 HARQ-ACK codebook that does not include NDI, in the feedback procedure based on CBG, for the target TB in the target HARQ process, if the UE has previously reported ACK, then the UE sets the corresponding HARQ-ACK information bit to NACK; otherwise, the UE feeds back the corresponding HARQ-ACK information. The problem that may occur in this procedure is that, when the same HARQ process is scheduled in two Type-3 HARQ-ACK codebook feedback procedures and the corresponding decoding information is ACK in the two procedures, the second Type-3 HARQ-ACK codebook does not include the ACK information obtained when the HARQ process is scheduled for the second time, and instead, the HARQ-ACK information is set as NACK after the ACK information is fed back in the last scheduling. As a result, the feedback of the Type-3 HARQ-ACK codebook is incorrect.

Similarly, for the Type-3 HARQ-ACK codebook that does not include NDI, in the feedback procedure based on TB, for the target TB in the target HARQ process, if the UE has previously reported NACK, UE feeds back corresponding HARQ-ACK information; otherwise, the UE sets the corresponding HARQ-ACK information bit to NACK. The problem that may occur in this procedure is that, when the same HARQ process is scheduled in two Type-3 HARQ-ACK codebook feedback procedures and the first decoding information is ACK, the second Type-3 HARQ-ACK codebook does not include the ACK information obtained when the HARQ process is scheduled for the second time, and instead, the HARQ-ACK information is set as NACK after the ACK information is fed back in the last scheduling. As a result, the feedback of the Type-3 HARQ-ACK codebook is incorrect.

Figure 4:
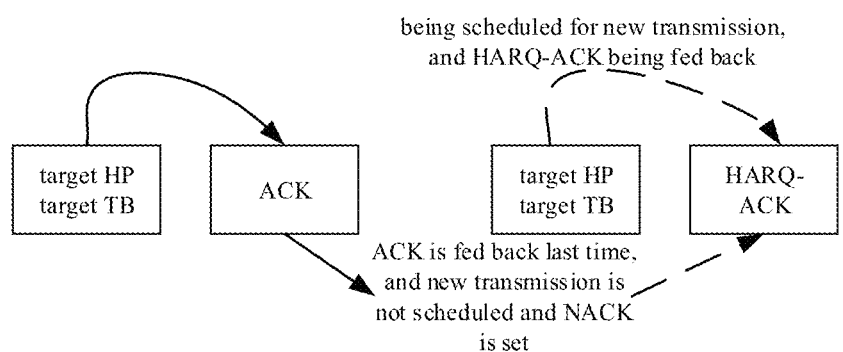
FIG. 4 is a schematic diagram showing changes in a HARQ-ACK codebook in the first embodiment of the present disclosure.

In the first embodiment of the present disclosure, as shown in FIG. 4, when the HARQ-ACK information bit for each TB is fed back, the HARQ-ACK information included in the Type-3 HARQ-ACK codebook to be fed back is determined according to the data scheduling information corresponding to the target TB in the target HARQ process, rather than directly setting the HARQ-ACK information as NACK after the user equipment has reported ACK. In this way, embodiments of the present disclosure can ensure that the Type-3 HARQ-ACK codebook is correctly reset or generated.

Second Embodiment

Figure 5:
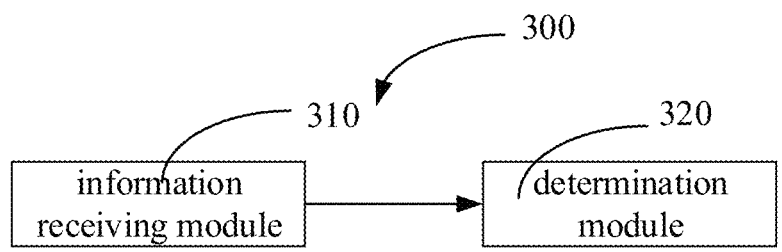
FIG. 5 is a block diagram of a HARQ-ACK codebook determination device according to a second embodiment of the present disclosure.

FIG. 5 is a HARQ-ACK codebook determination device 300 provided by a second embodiment of the present disclosure. The device 300 is applied to user equipment, and the device 300 includes: an information receiving module 310 and a determination module 320.

The information receiving module 310 is configured to receive trigger information sent by a network device, wherein the trigger information is used to indicate the user equipment to perform One-Shot HARQ-ACK feedback.

The determination module 320 is configured to, according to data scheduling information corresponding to a target Transport Block (TB) in a target HARQ process, determine HARQ-ACK information for the target TB in the target HARQ process in a Type-3 HARQ-ACK codebook, wherein the Type-3 HARQ-ACK codebook includes HARQ-ACK information corresponding to all HARQ processes on all configured carriers in a Physical Uplink Control Channel (PUCCH) group.

According to some embodiments, the data scheduling information corresponding to the target TB includes one of first information, second information and third information, wherein:
  the first information includes: information that the target TB is currently scheduled for new transmission;
  the second information includes: information that the target TB is currently scheduled for retransmission;
  the third information includes: information that the target TB is not currently scheduled.

According to some embodiments, the information that the target TB is currently scheduled for new transmission includes that: current NDI information for the target TB has a value different from last NDI information, or the target TB is a TB in Semi-Persistent Scheduling (SPS) PDSCH; or,
  according to some embodiments, the current NDI information for the target TB has a value the same as the last NDI information, or the target TB is the TB in the SPS PDSCH and the value of the NDI information is 1;
  according to some embodiments, the target TB does not currently correspond to NDI information, or the target TB does not currently correspond to NDI information and is not the TB in the SPS PDSCH.

According to some embodiments, the determination module 320 is configured to:

for the target TB in the target HARQ process, in response to the user equipment having reported ACK and the data scheduling information corresponding to the target TB being the second information or the third information, determine that the HARQ-ACK information for the target TB is NACK.

According to some embodiments, the determination module 320 is configured to:

for the target TB in the target HARQ process, in response to the user terminal having reported ACK and the data scheduling information corresponding to the target TB being the first information, determine that the HARQ-ACK information for the target TB is a decoding result.

According to some embodiments, the determination module 320 is configured to:

for the target TB in the target HARQ process, in response to the user equipment having reported NACK and the data scheduling information corresponding to the target TB being the first information or the second information, determine that the HARQ-ACK information for the target TB is a decoding result.

According to some embodiments, the determination module 320 is configured to:

for the target TB in the target HARQ process, in response to the user terminal having reported NACK and the data scheduling information corresponding to the target TB being the third information, determine that the HARQ-ACK information for the target TB is NACK.

According to some embodiments, in the One-Shot HARQ feedback, the user equipment may be configured through RRC signaling, so that when the user equipment performs HARQ feedback, the user equipment determines whether to perform CBG-based feedback for a carrier for which CBG-based transmission is configured.

According to some embodiments, the determination module 320 is further configured to: if the user equipment is configured to feed back One-Shot HARQ-ACK information based on CBG and a target cell corresponding to the target HARQ process is configured with the CBG feedback length, determine the bit length of the HARQ-ACK information for the target TB according to the CBG feedback length; otherwise, determine the bit length of the HARQ-ACK information for the target TB according to the TB feedback length.

According to some embodiments, if the user equipment is configured to feed back One-Shot HARQ-ACK information based on CBG, and a target cell corresponding to the target HARQ process being configured with the CBG feedback length, the determination module 320 determines the bit length of the HARQ-ACK information for the target TB according to the CBG feedback length; otherwise, the determination module 320 determines the bit length of the HARQ-ACK information for the target TB according to the TB feedback length.

According to some embodiments, the trigger information includes Downlink Control Information (DCI) sent by the network device to the user equipment.

For the non-detailed parts in the second embodiment, please refer to the same or corresponding parts in the above-mentioned first embodiment, which will not be repeated here.

Third Embodiment

Figure 6:
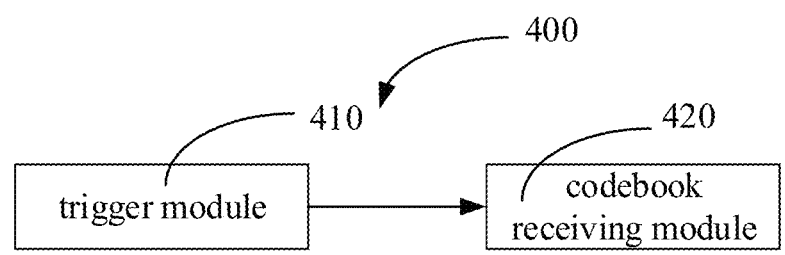
FIG. 6 is a block diagram of a HARQ-ACK codebook determination device according to a third embodiment of the present disclosure.

FIG. 6 is a HARQ-ACK codebook determination device 400 provided by the third embodiment of the present disclosure. The device 400 is applied to a network device, and the device 400 includes a trigger module 410 and a codebook receiving module 420.

The trigger module 410 is configured to send trigger information to user equipment, wherein the trigger information is used to indicate the user equipment to perform One-Shot HARQ-ACK feedback.

The codebook receiving module 420 is configured to receive a Type-3 HARQ-ACK codebook which is fed back by the user equipment, wherein the Type-3 HARQ-ACK codebook includes HARQ-ACK information corresponding to all HARQ processes on all configured carriers in a Physical Uplink Control Channel (PUCCH) group, and HARQ-ACK information for a target Transport Block (TB) in a target HARQ process in the Type-3 HARQ-ACK codebook is determined by the user equipment according to data scheduling information corresponding to the target TB in the target HARQ process.

According to some embodiments, the data scheduling information corresponding to the target TB includes one of first information, second information and third information, wherein:

the first information includes: information that the target TB is currently scheduled for new transmission;

the second information includes: information that the target TB is currently scheduled for retransmission;

the third information includes: information that the target TB is not currently scheduled.

According to some embodiments, the information that the target TB is currently scheduled for new transmission includes that: current NDI information for the target TB has a value different from last NDI information, or the target TB is a TB in Semi-Persistent Scheduling (SPS) PDSCH.

According to some embodiments, the information that the target TB is currently scheduled for retransmission includes that: the current NDI information for the target TB has a value the same as the last NDI information, or the target TB is the TB in the SPS PDSCH and the value of the NDI information is 1.

According to some embodiments, the information that the target TB is not currently scheduled includes that: the target TB does not currently correspond to NDI information, or the target TB does not currently correspond to NDI information and is not the TB in the SPS PDSCH.

According to some embodiments, the trigger information includes Downlink Control Information (DCI) sent by the network device to the user equipment.

For the non-detailed parts in the third embodiment, please refer to the same or corresponding parts in the above-mentioned first embodiment, which will not be repeated here.

Fourth Embodiment

Figure 7:
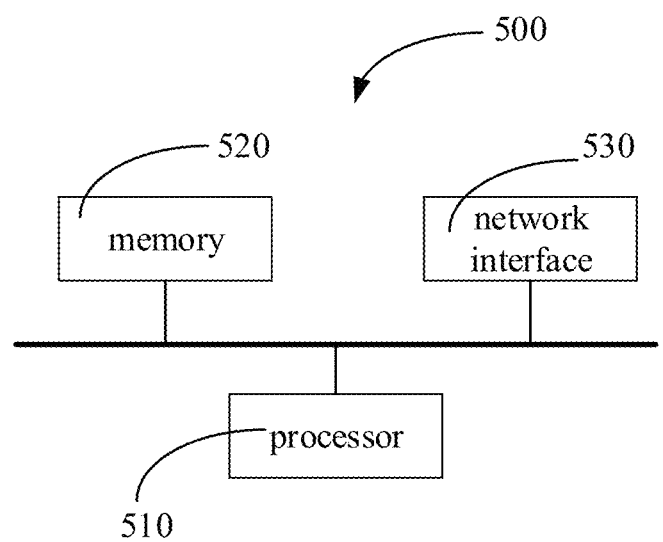
FIG. 7 is a schematic structural diagram of a HARQ-ACK codebook determination device according to a fourth embodiment of the present disclosure.

FIG. 7 is a schematic structural diagram of a HARQ-ACK codebook determination device 500 provided by the fourth embodiment of the present disclosure. The HARQ-ACK codebook determination device 500 includes: a processor 510, a memory 520 and a network interface 530. The processor 510 calls the program in the memory 520 to execute the corresponding processes implemented by the network device in the HARQ-ACK codebook determination method provided in the first embodiment above, or to execute the corresponding processes implemented by the user equipment in the HARQ-ACK codebook determination method provided in the first embodiment above, and the execution result is sent out through the network interface 530.

The processor 510 may be an independent component, or may be a collective term for multiple processing components. For example, the processor 510 may be a CPU, an ASIC, or one or more integrated circuits configured to implement the above methods, such as at least one microprocessor DSP, or at least one programmable gate array FPGA, etc.

The present disclosure is described with reference to flowchart illustrations and/or block diagrams of methods, apparatus (systems), and computer program products according to embodiments of the present disclosure. It will be understood that each flow and/or block in the flowcharts and/or block diagrams, and combinations of flows and/or blocks in the flowcharts and/or block diagrams, can be implemented by computer program instructions. These computer program instructions may be provided to the processor of a general purpose computer, a special purpose computer, an embedded processor, a chip or other programmable data processing device to produce a machine, so that the instructions to be executed by the processor of the computer or other programmable data processing device generates device for implementing the functions specified in a flow or flows of the flowcharts and/or a block or blocks of the block diagrams. The program may be stored in a computer-readable storage medium, and the storage medium may include: a read only memory (ROM), a random access memory (RAM,), a magnetic disk or an optical disk, and the like.

The above-described embodiments are provided for illustration but are not intended to limit the present disclosure, and those skilled in the art may design multiple alternative examples within the scope of the claims. Those skilled in the art will appreciate that appropriate adjustments, modifications, etc. may be made to specific implementations without departing from the scope of the present disclosure as defined by the appended claims. Therefore, any modifications and changes made in accordance with the spirit and principles of the present disclosure fall within the scope of the present disclosure as defined by the appended claims.

What is claimed is:

1. A Hybrid Automatic Repeat-reQuest-Acknowledge (HARQ-ACK) codebook determination method, applied to user equipment, wherein the method comprises:
   receiving trigger information sent by a network device, wherein the trigger information is used to indicate the user equipment to perform One-Shot HARQ-ACK feedback; and
   according to data scheduling information corresponding to a target Transport Block (TB) in a target HARQ process, determining HARQ-ACK information for the target TB in the target HARQ process in a Type-3 HARQ-ACK codebook, wherein the Type-3 HARQ-ACK codebook comprises HARQ-ACK information corresponding to all HARQ processes on all configured carriers in a Physical Uplink Control Channel (PUCCH) group;
   wherein the data scheduling information corresponding to the target TB comprises one of first information, and third information, wherein:
   the first information comprises: information that the target TB is currently scheduled for new transmission; and the third information comprises: information that the target TB is not currently scheduled;
   wherein determining the HARQ-ACK information for the target TB in the target HARQ process in the Type-3 HARQ-ACK codebook according to the data scheduling information corresponding to the target TB in the target HARQ process, comprises:
   for the target TB in the target HARQ process, in response to the user equipment having reported ACK/NACK and the data scheduling information corresponding to the target TB being the third information, determining, by the user equipment, that the HARQ-ACK information for the target TB is NACK.

2. The method according to claim 1, wherein the information that the target TB is not currently scheduled comprises that:
   the user equipment has not received DCI comprises scheduling information for the target TB in the target HARQ process; or, the user equipment does not receive SPS PDSCH corresponding to the target TB in the target HARQ process.

3. The method according to claim 1, wherein:
   the information that the target TB is currently scheduled for new transmission comprises that: current NDI information for the target TB has a value different from last NDI information, or the target TB is a TB in Semi-Persistent Scheduling (SPS) PDSCH; and/or,
   the information that the target TB is currently scheduled for retransmission comprises that: the current NDI information for the target TB has a value the same as the last NDI information, or the target TB is the TB in the SPS PDSCH and the value of the NDI information is 1; and/or,
   the information that the target TB is not currently scheduled comprises that: the target TB does not currently correspond to NDI information, or the target TB does not currently correspond to NDI information and is not the TB in the SPS PDSCH.

4. The method according to claim 1, wherein determining the HARQ-ACK information for the target TB in the target HARQ process in the Type-3 HARQ-ACK codebook according to the data scheduling information corresponding to the target TB in the target HARQ process, further comprises:
   for the target TB in the target HARQ process, in response to the user equipment having reported ACK/NACK and the data scheduling information corresponding to the target TB being the first information, determining, by the user equipment, that the HARQ-ACK information for the target TB is a decoding result.

5. The method according to claim 1, wherein determining the HARQ-ACK information for the target TB in the target HARQ process in the Type-3 HARQ-ACK codebook, comprises:
   determining a bit length of the HARQ-ACK information for the target TB according to a Code Block Group (CBG) feedback length; or,
   determining the bit length of the HARQ-ACK information for the target TB according to a TB feedback length.

6. The method according to claim 5, wherein in response to the user equipment being configured to feed back One-Shot HARQ-ACK information based on CBG, and a target cell corresponding to the target HARQ process being configured with the CBG feedback length, the bit length of the HARQ-ACK information for the target TB is determined according to the CBG feedback length; otherwise, the bit length of the HARQ-ACK information for the target TB is determined according to the TB feedback length.

7. The method according to claim 1, wherein the trigger information comprises Downlink Control Information (DCI) sent by the network device to the user equipment.

8. A user equipment, comprising a processor, a transceiver, memory and instructions stored in the memory that, when executed by the processor, cause the user equipment to:
receive trigger information sent by a network device, wherein the trigger information is used to indicate the user equipment to perform One-Shot HARQ-ACK feedback; and
according to data scheduling information corresponding to a target Transport Block (TB) in a target HARQ process, determine HARQ-ACK information for the target TB in the target HARQ process in a Type-3 HARQ-ACK codebook, wherein the Type-3 HARQ-ACK codebook comprises HARQ-ACK information corresponding to all HARQ processes on all configured carriers in a Physical Uplink Control Channel (PUCCH) group;
wherein the data scheduling information corresponding to the target TB comprises one of first information, and third information, wherein:
the first information comprises: information that the target TB is currently scheduled for new transmission; and
the third information comprises: information that the target TB is not currently scheduled;
wherein when the instructions are executed by the processor, the user equipment is caused to:
for the target TB in the target HARQ process, in response to the user equipment having reported ACK/NACK and the data scheduling information corresponding to the target TB being the third information, determine that the HARQ-ACK information for the target TB is NACK.

9. The user equipment according to claim 8, wherein the information that the target TB is not currently scheduled comprises that:
the user equipment has not received DCI comprises scheduling information for the target TB in the target HARQ process; or, the user equipment does not receive SPS PDSCH corresponding to the target TB in the target HARQ process.

10. The user equipment according to claim 8, wherein:
the information that the target TB is currently scheduled for new transmission comprises that: current NDI information for the target TB has a value different from last NDI information, or the target TB is a TB in Semi-Persistent Scheduling (SPS) PDSCH; or,
the information that the target TB is currently scheduled for retransmission comprises that: the current NDI information for the target TB has a value the same as the last NDI information, or the target TB is the TB in the SPS PDSCH and the value of the NDI information is 1; and
the information that the target TB is not currently scheduled comprises that: the target TB does not currently correspond to NDI information, or the target TB does not currently correspond to NDI information and is not the TB in the SPS PDSCH.

11. The user equipment according to claim 8, wherein when the instructions stored in the memory are executed by the processor, the user equipment is further caused to:
for the target TB in the target HARQ process, in response to the user equipment having reported ACK/NACK and the data scheduling information corresponding to the target TB being the first information, determine that the HARQ-ACK information for the target TB is a decoding result.

12. The user equipment according to claim 8, wherein when the instructions stored in the memory are executed by the processor, the user equipment is caused to:
determine a bit length of the HARQ-ACK information for the target TB according to a Code Block Group (CBG) feedback length; or,
determine the bit length of the HARQ-ACK information for the target TB according to a TB feedback length.

13. The user equipment according to claim 12, wherein when the instructions stored in the memory are executed by the processor, the user equipment is caused to: in response to the user equipment being configured to feed back One-Shot HARQ-ACK information based on CBG, and a target cell corresponding to the target HARQ process being configured with the CBG feedback length, determine the bit length of the HARQ-ACK information for the target TB according to the CBG feedback length; otherwise, determine the bit length of the HARQ-ACK information for the target TB according to the TB feedback length.

14. The user equipment according to claim 8, wherein the trigger information comprises Downlink Control Information (DCI) sent by the network device to the user equipment.

15. A network device, comprising a processor, a transceiver, memory and instructions stored in the memory that, when executed by the processor, cause the network device to:
send trigger information to user equipment, wherein the trigger information is used to indicate the user equipment to perform One-Shot HARQ-ACK feedback; and
receive a Type-3 HARQ-ACK codebook which is fed back by the user equipment, wherein the Type-3 HARQ-ACK codebook comprises HARQ-ACK information corresponding to all HARQ processes on all configured carriers in a Physical Uplink Control Channel (PUCCH) group, and HARQ-ACK information for a target Transport Block (TB) in a target HARQ process in the Type-3 HARQ-ACK codebook is determined by the user equipment according to data scheduling information corresponding to the target TB in the target HARQ process, wherein for the target TB in the target HARQ process, in response to the user equipment having reported ACK/NACK and the data scheduling information corresponding to the target TB being the third information, it is determined by the user equipment that the HARQ-ACK information for the target TB is NACK;
wherein the data scheduling information corresponding to the target TB comprises one of first information, and third information, wherein:
the first information comprises: information that the target TB is currently scheduled for new transmission; and
the third information comprises: information that the target TB is not currently scheduled.

16. The network device according to claim 15, wherein the information that the target TB is not currently scheduled comprises that:
the user equipment has not received DCI comprises scheduling information for the target TB in the target HARQ process; or, the user equipment does not receive SPS PDSCH corresponding to the target TB in the target HARQ process.

17. The network device according to claim 15, wherein:
the information that the target TB is currently scheduled for new transmission comprises that: current NDI information for the target TB has a value different from last NDI information, or the target TB is a TB in Semi-Persistent Scheduling (SPS) PDSCH; or, the information that the target TB is currently scheduled for retransmission comprises that: the current NDI information for the target TB has a value the same as the last NDI information, or the target TB is the TB in the SPS PDSCH and the value of the NDI information is 1;

the information that the target TB is not currently scheduled comprises that: the target TB does not currently correspond to NDI information, or the target TB does not currently correspond to NDI information and is not the TB in the SPS PDSCH.

18. The network device according to claim 15, wherein the trigger information comprises Downlink Control Information (DCI) sent by the network device to the user equipment.

* * * * *